United States Patent [19]

Espenschied

[11] 4,223,256

[45] Sep. 16, 1980

[54] LIMIT SWITCH FOR D-C POSITIONING MOTOR

[75] Inventor: Helmut Espenschied, Ludwigsburg, Fed. Rep. of Germany

[73] Assignee: Robert Bosch GmbH, Stuttgart, Fed. Rep. of Germany

[21] Appl. No.: 973,676

[22] Filed: Dec. 27, 1978

[30] Foreign Application Priority Data

Jan. 13, 1978 [DE] Fed. Rep. of Germany ....... 2801284

[51] Int. Cl.[2] .............................................. H02P 3/10

[52] U.S. Cl. .................................... 318/282; 307/146; 318/293; 318/468

[58] Field of Search ................ 318/282; 328/261, 293, 328/294, 468; 307/138, 146

[56] References Cited

U.S. PATENT DOCUMENTS

| | | | |
|---|---|---|---|
| 2,397,557 | 4/1946 | McCoy | 318/261 |
| 2,606,312 | 8/1952 | Rogers | 318/293 |
| 2,755,423 | 7/1956 | Hager | 318/468 |
| 2,912,632 | 11/1959 | Turtil | 318/293 |
| 3,173,031 | 3/1965 | Slater | 307/146 |
| 3,290,575 | 12/1966 | Modiano | 318/293 |
| 3,378,699 | 4/1968 | Bruinsma | 318/293 |

*Primary Examiner*—David Smith, Jr.
*Attorney, Agent, or Firm*—Frishauf, Holtz, Goodman & Woodward

[57] ABSTRACT

The limit switch includes a diode which is connected through a spring-operated switch in circuit with a d-c motor such that, when the motor is commanded to operate in one direction and its limit is reached, the diode is placed in blocking direction in the circuit but, upon reversal of polarity of supply to the motor to reverse its direction, the diode becomes conductive so that a closed circuit is immediately established therefor, the conductive direction of the diode being maintained until a reverse limit is reached, at which time the then conductive diode will be connected in blocked direction. During operation in the normal operating zone of the motor, the diode is short-circuited. The switches themselves can readily be constructed to be cam-operated, for example from a rotating shaft which, selectively, connects the diode in a double-pole, double-throw, center-ON circuit arrangement.

7 Claims, 3 Drawing Figures

LIMIT SWITCH FOR D-C POSITIONING MOTOR

Figure 1:
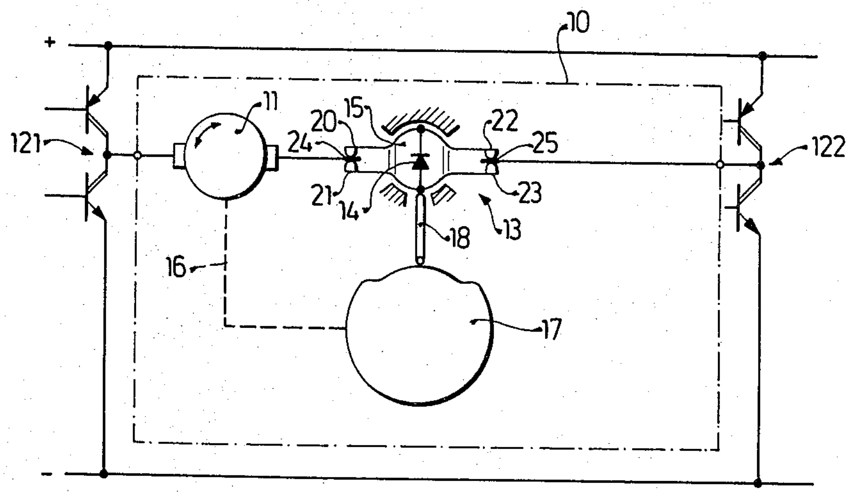

The present invention relates to a limit switch, and more particularly to a limit switch which is suitable for use in connection with d-c motors operating in two different directions of rotation, depending on polarity of supplied power; the switch is equally applicable to other types of motors in which polarity of current supply in a circuit thereof determines the direction of rotation of the motor.

BACKGROUND AND PRIOR ART

Various types of apparatus require limit switches in order to stop a moving element driven by a motor when a predetermined deflection or end position has been reached. Such limit switches are usually constructed in the form of microswitches or the like and interrupt power to a motive source, typically interrupting electrical power to an electric motor. If rotating elements are used, sliding contacts may be used as limit switches which, when a particular point is exceeded, interrupt current supply to the motor.

The limit switches have the disadvantage that, to reverse rotation of the motor, complex circuits are needed in order to permit re-energization of the motor in reverse direction after the limit switch has been operated, requiring a plurality of microswitches; if sliding contacts are used, the reliability of contact engagement is impaired due to dirt and other possible interruptions of the circuit and, additionally, construction of such contacts for reliable operation is comparatively expensive.

THE INVENTION

It is an object to provide a limit switch arrangement which is simple, reliable, and which permits reversal of operation of a motor, after a limit has been reached, without complex apparatus or circuit components.

Briefly, a diode is connected in the limit switch which is constructed in the form of a double-pole, double-throw, center-ON circuit arrangement. In ordinary operation, that is, when the motor is driving a shaft or an otherwise deflectable element between its normal operating limits, the diode is short-circuited, thus permitting application of power to the motor, or its direction controlling circuit component in accordance with either polarity. When one of the limits is reached, the diode is placed in circuit in such a polarity that current supply to the motor in the just preceding direction of operation is blocked permitting, however, continued current supply to the motor in the opposite direction to permit reversal thereof; reversal of operation of the motor then again causes the switch to reach the short circuit condition and, if the motor drives the positioning element to the other limit, the diode is then connected to be in circuit, again in blocked connection, with respect to the reversed polarity, thus again stopping the motor, but permitting reversal of polarity of supply to the motor and return again to the normal operating zone.

In accordance with a feature of the invention, a rocker element can be rocked from a neutral position, when an end position is reached, the rocker element in the neutral position carrying four contacts, of which two each form an input and two each form an output circuit. The two contacts of each of the circuits are bridged by a diode. Normally, and during operation of the motor within the permitted zone, the input and output circuits are connected together by the bridging connection which also includes the diode. When an end position is reached, the rocker element is rocked in such a manner that only one of the input terminals and one of the output terminals are connected together, thus placing the diode in circuit between the connected input and output terminals, in a first direction of polarity which is so selected that, at the then rocked position, current supply to the direction determining circuit of the motor is blocked. Rocking of the rocker element in the other direction reversed the connection of the input and output terminals with respect to the polarity of the diode.

The system has the advantage that two end positions can be easily determined by connection of a diode in the control circuit of a positioning motor, which is reliable and easy to construct. The system can be made inexpensively, and the operating reliability thereof is high.

The limit switch is particularly suitable to determine operating limits of d-c - servo motors. It can be constructed in very small dimensions and, other than a few contact spring elements, requires only a diode which can readily be integrated with the mechanical spring contacts and the rocker arm carrier therefor.

The limit switch is particularly suitable for low-voltage applications, for example for use in automotive vehicles where the motor serves as a speed control servo, in which the throttle position of an internal combustion engine is changed in dependence on a control signal derived from a control unit, but in which the limit of deflection of the throttle should be accurately determined. The system can be used for many other applications as well, both to determine the end position of a rotary positioning element, as well as for longitudinal positioning elements in which, for example, two such rocker arms can be used, one each positioned at a terminal end of the positioning path, and electrically connected in series. Such positioning elements can be used, for example, in the packaging and transport field, for machine tools and various other types of automatic control applications.

Figure 2:
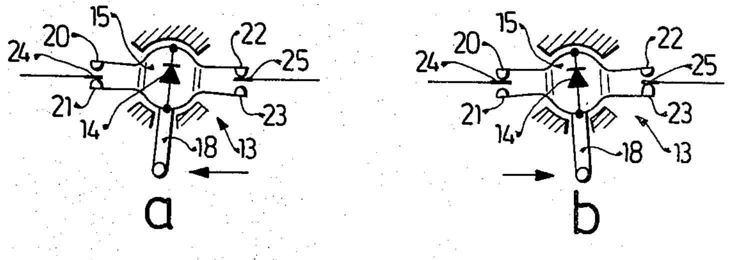

Drawings, illustrating a preferred example:

FIG. 1 is a general schematic circuit diagram of the system and the arrangement of the switch; and FIG. 2 shows two operated positions of the rocker deflection element, in which view a shows deflection upon operation of the unit towards the left side, and view b shows deflection upon operation of the positioning element towards the right side.

A positioning system 10 (FIG. 1) has a d-c motor 11, the direction of rotation of which is determined by the polarity of current supply thereto, commanded by respective energization of one or the other of the transistors of the transistor pairs 121, 122, as well known. The motor is shown as a permanent magnet d-c motor, but can be of any other type, the connections to the motor as illustrated being those connections which, in the motor, determine its direction of rotation depending on direction of current flow through the motor, that is, either from left to right or from right to left or, in other words, the polarity of the applied voltages to the motor direction determining terminals. The motor shaft, schematically indicated at 16, is connected to a cam disk 17 on which a cam follower 18 is engaged. When the motor reaches a terminal position, the disk 17 deflects the cam follower 18 towards either the right or the left, as seen in FIG. 2.

The direction determining terminals of the motor 11 are connected in series with the limit switch in accordance with the present invention. The limit switch 13 has a rocker element 15 which carries electrical connections and a diode 14. The rocker arm 15 has two pairs of contact tongues 20, 21; 22, 23 located at opposite ends of the rocker 15. In the quiescent condition of the limit switch, that is, when the motor 16 is operating within its ordinary operating zone, the contact tongues 20, 21; 22, 23 retain therebetween contact springs 24, 25. The upper contact tongues 20, 22 are connected together; the lower contact tongues 21, 23 are connected together, and diode 14 is connected between the connections 20–22 and 21–23. Terminals 20, 21, 24 may be termed the input terminals, and 22, 23, 25 the output terminals of the limit switch.

In the quiescent condition—see FIG. 1—the rocker 15 is in the neutral position shown in FIG. 1. Current can flow from the respective transistor of the pair 121 through the motor 11 and the respective conductive transistor of the pair 122 in dependence on the conduction of the respective transistors of the pairs, that is, in either direction, since the diode 15 is short-circuited. The contact tongues 20, 21; 22, 23 each retain the spring contacts 24, 25 therebetween and all four contacts and the spring contacts 24, 25 are connected together.

If motor 11 rotates to one terminal position, for example such that disk 17 is deflected to its limit position in counter-clockwise direction, then the rocker 15 will change to the position shown in FIG. 2 view a, that is, will be rocked in clockwise direction. In this position, the contact 20 is lifted off spring contact 24; contact 23 is lifted off spring contact 25, leaving the connection between the spring contacts 24, 25 in the main circuit of the motor between the terminals 21 through diode 14 and terminal 22. The polarity of the diode 14 is so selected with respect to the direction of current supply to the motor 11 that, when the disk 17 has reached its counter-clockwise limit, the diode is connected in blocking direction between the motor and the respective transistors of the pairs 121, 122. The motor thus will stop. The motor can be reversed, however, readily by controlling the other one of the respective transistors of the pairs 121, 122 to conduction since, for reverse operation, the diode will then be in forward direction so that the motor can readily return to its normal operating range. As soon as the limit has been left, the rocker 15 will return to its central position, for example under force of external springs or by the spring force of the spring contacts 20, 21, 22, 23 and the spring arms 24, 25 themselves. The motor can now operate within its normal operating range; should it reach the other operating limit, that is, rotation of the disk 17 in clockwise direction and consequent rocking of rocker 15 in counter-clockwise direction, the circuit relationship will be as shown in FIG. 2, view b, with the diode now connected between terminals 24–20 and 23–25, that is, in reverse polarity with respect to the view a of FIG. 2. Again, current flow through the motor in the previously existing operating direction has been blocked, but reversal of the motor is readily possible by reversal of polarity of current flow through the motor and through the diode.

The system has been shown in connection with a single moving element which moves the rocker 15, by means of the follower 18, in either direction. It is also possible to use two such switches, serially connected at two end limits, for example at the limits of a transport path and the like. The terminal 25 of one such switch will then be serially connected with the terminal 24 of the other, the terminal 25 of the other switch being connected to the output of the entire servo system. If the motor moves within the permitted zone, one of the limit switches will be deflected, the other one remaining in the neutral position and thus conductive in either direction. The limit switch thus is suitable not only to be controlled by a movable element following a positioning motor, but can also be controlled by limit or end positions of a positioned element.

Various changes and modifications may be made within the scope of the inventive concept.

I claim:

1. Limit switch to control the operation of an electrical motor (11), the direction of rotation of which is controllable by an applied d-c voltage, comprising a spring switch (13) and a diode (14) connected in the switching path of the spring switch and controlling passage or blocking of current flow to the motor in dependence on operation of the spring switch, said spring switch being positioned in the path of a positioned element (17), the limit position of which is to be controlled; wherein said spring switch (13) comprises a rocker element (15) having a center or neutral position, and two respectively oppositely rocked operating positions;

two pairs of terminal contacts (20, 21; 22, 23) being secured to opposite sides of said rocker element (15) and deflecting in respectively opposite directions upon rocking of said rocker element, the contacts of the contact pairs facing each other and forming, respectively, first and second respective contact elements, corresponding first contact elements (20, 22) of said pairs being connected together and corresponding second contact elements (21, 23) of said pairs being connected together, the diode (14) being connected between the first and second connected contact elements;

and spring contacts (24, 25) interposed between said opposed contact elements (20, 21; 22, 23) of each pair and connected serially with the motor and the motor current source of supply, the spring contacts (24, 25), in the quiescent or rest position of the rocker arm (15), connecting with both the first and second contact terminals (20, 21; 22, 23) of both said pairs and, upon deflection of said rocker element (15) into a rocked position, connecting with a first contact element of one pair, and a second contact element of the other, or vice versa, to place the diode connected between the first and second contacts of the pairs in circuit with the motor and the source of current supply.

2. Switch according to claim 1, wherein the motor is of the type in which the relative polarity of applied d-c voltage controls its direction of operation, and the spring switch is of the double-pole, double-throw, center-ON type, having two pairs of contacts (20, 21; 22, 23), with the diode connected across the contacts of said pairs, said switch, selectively, connecting all said contacts in circuit with the motor when the motor is operating within the limits of the switch and, upon switch operation when the limit has been reached, with the diode in circuit with the motor, the diode being poled in blocking direction with respect to the direction of current flow prior to switch operation, to permit, upon reversal of current flow, without change in switch position, current through the diode which will then be poled in conductive direction with respect to the reversed current, and permit immediate resumption of motor operation in reverse direction of rotation.

3. Switch according to claim 1, wherein said motor is a d-c motor, and said positioned element is coupled to the motor to operate said spring switch (13).

4. Switch according to claim 1, wherein the motor is of the type in which the relative polarity of applied d-c voltage controls its direction of operation, the diode (14) being poled with respect to the direction of current supply to the motor to be placed in blocking direction in circuit with the motor when the rocker element (15) is rocked upon engagement with the positioned element (17) when the limit is reached, and to permit immediate resumption of motor operation upon reversal of direction of current flow to the motor.

5. Switch according to claim 1, wherein the positioned element (17) comprises a cam disk coupled to the motor (11) and a switching arm (18) engaged by the cam disk and effecting rocking of the rocker element (15) when the cam disk (17) has reached a predetermined limiting position by engagement of a camming surface with the switching arm (18).

6. Limit switch to control the operation of an electric motor (11) of the type in which the relative polarity of applied d-c voltage controls its direction of operation comprising a double-pole, double-throw, center-ON type spring switch (13) having two pairs of contacts (20, 21, 22, 23), and a diode (14) connected across the contacts of said pairs; and controlling passage of or blocking of current flow to the motor in dependence on operation of the spring switch, said spring switch being positioned in the path of a positioned element (17), the limit position of which is to be controlled;

said switch, selectively, connecting all said contracts in circuit with the motor when the motor is operating within the limits of the switch and, upon switch operation when the limit has been reached, connecting the diode in circuit with the motor, the diode being poled in blocking direction with respect to the direction of current flow prior to switch operation, to permit, upon reversal of current flow, without change in switch position, current flow through the diode, which will then be poled in conductive direction with respect to the reversed current, and thus permit immediate resumption of motor operation in reverse direction of rotation.

7. Switch according to claim 6, wherein said motor is a d-c motor, and said positioned element is coupled to the motor to operate said spring switch (13).

* * * * *